United States Patent [19]

Hoppman et al.

[11] Patent Number: 4,848,559
[45] Date of Patent: Jul. 18, 1989

[54] METHOD OR APPARATUS FOR ELEVATING ARTICLES IN A FEEDER

[75] Inventors: Kurt H. Hoppman, Falls Church; James G. Lin, Springfield; Werner H. Schmitt, Falls Church, all of Va.

[73] Assignee: Hoppmann Corporation, Chantilly, Va.

[21] Appl. No.: 219,893

[22] Filed: Jul. 14, 1988

Related U.S. Application Data

[62] Division of Ser. No. 857,478, Apr. 30, 1986, abandoned.

[51] Int. Cl.[4] .............................................. B65G 29/00
[52] U.S. Cl. .................................................... 198/392
[58] Field of Search ......................................... 198/392

[56] References Cited

U.S. PATENT DOCUMENTS

| | | |
|---|---|---|
| 2,767,881 | 10/1956 | Gruenberg . |
| 2,888,169 | 5/1959 | Hausman et al. . |
| 2,904,162 | 9/1954 | Simer . |
| 2,928,521 | 3/1960 | Johnson ............................... 198/392 |
| 3,063,596 | 11/1962 | D'Authevile et al. . |
| 3,531,092 | 9/1970 | Praschak et al. . |
| 3,543,909 | 12/1970 | Ueda . |
| 3,635,325 | 1/1972 | Sterling . |
| 3,658,207 | 4/1972 | Schultz . |
| 3,669,260 | 6/1972 | Hoppmann et al. . |
| 3,684,077 | 8/1972 | MacIntyre . |
| 3,722,674 | 3/1973 | Hoppmann et al. . |
| 3,826,405 | 7/1974 | Hoppmann et al. ................ 198/392 |
| 3,831,734 | 8/1974 | Hoppmann et al. ................ 198/382 |
| 3,900,107 | 8/1975 | Hoppman ........................... 198/392 |
| 3,912,120 | 10/1975 | Hoppmann et al. ................ 198/392 |
| 3,960,293 | 6/1976 | Sweet, II et al. . |
| 3,986,636 | 10/1976 | Hoppmann et al. . |
| 4,007,854 | 2/1977 | Ervine ................................ 198/392 |
| 4,093,062 | 6/1978 | Sjögren ............................... 198/392 |
| 4,094,412 | 6/1978 | Hoppmann et al. ................ 198/392 |
| 4,098,280 | 7/1978 | Ristvedt et al. . |
| 4,211,248 | 7/1980 | Lafon . |
| 4,305,496 | 12/1981 | Hoppmann et al. . |
| 4,388,989 | 6/1983 | Edmunds et al. . |
| 4,429,808 | 2/1984 | Doty . |
| 4,462,508 | 7/1984 | Grafius . |
| 4,527,326 | 7/1985 | Kohno et al. ...................... 198/392 |

FOREIGN PATENT DOCUMENTS

| | | |
|---|---|---|
| 2757055 | 6/1978 | Fed. Rep. of Germany ...... 198/392 |
| 2518134 | 2/1980 | Fed. Rep. of Germany . |

Primary Examiner—Randolph A. Reese
Assistant Examiner—Anthony Knight
Attorney, Agent, or Firm—Birch, Stewart, Kolasch & Birch

[57] ABSTRACT

A kit for converting a fixed ramp rotating bowl feeder into a flexible disk, stationary ramp rotating bowl feeder including an overhead ramp support for spanning the distance between side walls of the rotating bowl. A retaining tube is affixed to substantially a central portion of the overhead ramp support. A stationary ramp is affixed to one end of the retaining tube and projecting outwardly toward the side walls of the rotating bowl. A flexible disk mounted on the stationary ramp for rotating within the rotating bowl together with the rotating bowl for transporting articles disposed within the bowl upwardly to be discharged therefrom.

4 Claims, 4 Drawing Sheets

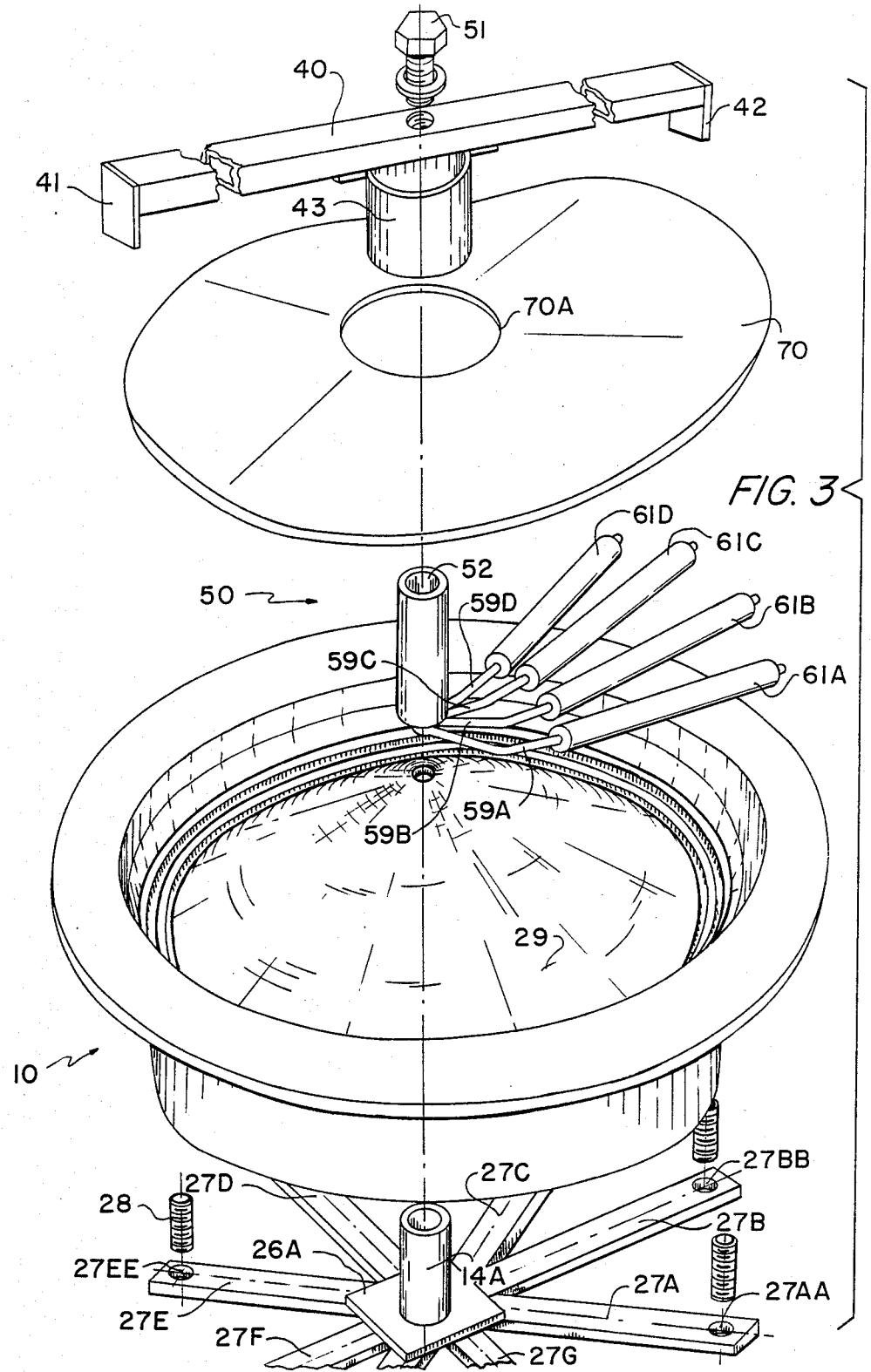

METHOD OR APPARATUS FOR ELEVATING ARTICLES IN A FEEDER

This application is a divisional of application Ser. No. 06/857,478 filed on Apr. 30, 1986, now abandoned.

BACKGROUND OF THE INVENTION

1. Field of the Invention

The present invention is directed to a kit for converting a fixed ramp rotating bowl feeder into a flexible ramp rotating bowl feeder.

2. Description of Background Art

A number of centrifugal feeders are available for elevating an article from a rotating bowl upwardly onto an outer peripheral rotating rim. One type of feeder employs a stationary ramp or a mechanical wedge which engages the articles within an outer peripheral surface of the rotating bowl and elevates them upwardly to a peripheral rotating outer rim. Another type of centrifugal bowl feeder employs a flexible disk which is rotated over a stationary ramp to elevate articles disposed within a bowl upwardly onto an outer peripheral rotating rim.

SUMMARY AND OBJECTS OF THE INVENTION

It is an object of the present invention to provide a kit for converting a fixed ramp rotating bowl feeder into a flexible ramp rotating bowl feeder.

A further object of the present invention is to provide a kit for mounting on an existing fixed ramp rotating bowl so as to provide flexibility in utilizing the bowl as either a flexible ramp rotating bowl feeder or, by removing the kit, converting the device back to a fixed ramp rotating bowl feeder.

A further object of the present invention is to provide a flexible disk which rotates together with the rotating bowl over a stationary ramp which is affixed to a central support member.

A further object of the present invention is to provide a bowl which includes a cone-shaped inner surface for guiding articles supplied to the bowl outwardly to the upwardly extending walls of the bowl surface.

A further object of the present invention is to provide a bowl which is constructed of a foam core with a high density skin disposed on the outer surface thereof. The bowl construction is not limited and may be constructed of other materials such as plastic, steel and aluminum.

These and other objects of the present invention are achieved by providing a kit for converting a fixed ramp rotating bowl feeder into a flexible ramp rotating bowl feeder. An overhead ramp support is provided for spanning the distance between the side walls of the rotating bowl. A retaining tube is affixed to substantially a central portion of the overhead ramp support. A stationary ramp is affixed to one end of the retaining tube and projects outwardly towards the side wall of the rotating bowl. A flexible disk is set on top of the rotating bowl but elevated by the stationary ramp. The flexible disk rotates within the rotating bowl due to friction together with the rotating bowl for transporting articles disposed within the bowl upwardly to be discharged therefrom.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a partial exploded view illustrating the various components of the kit;

DETAILED DESCRIPTION OF THE PREFERRED EMBODIMENTS

Figure 1:
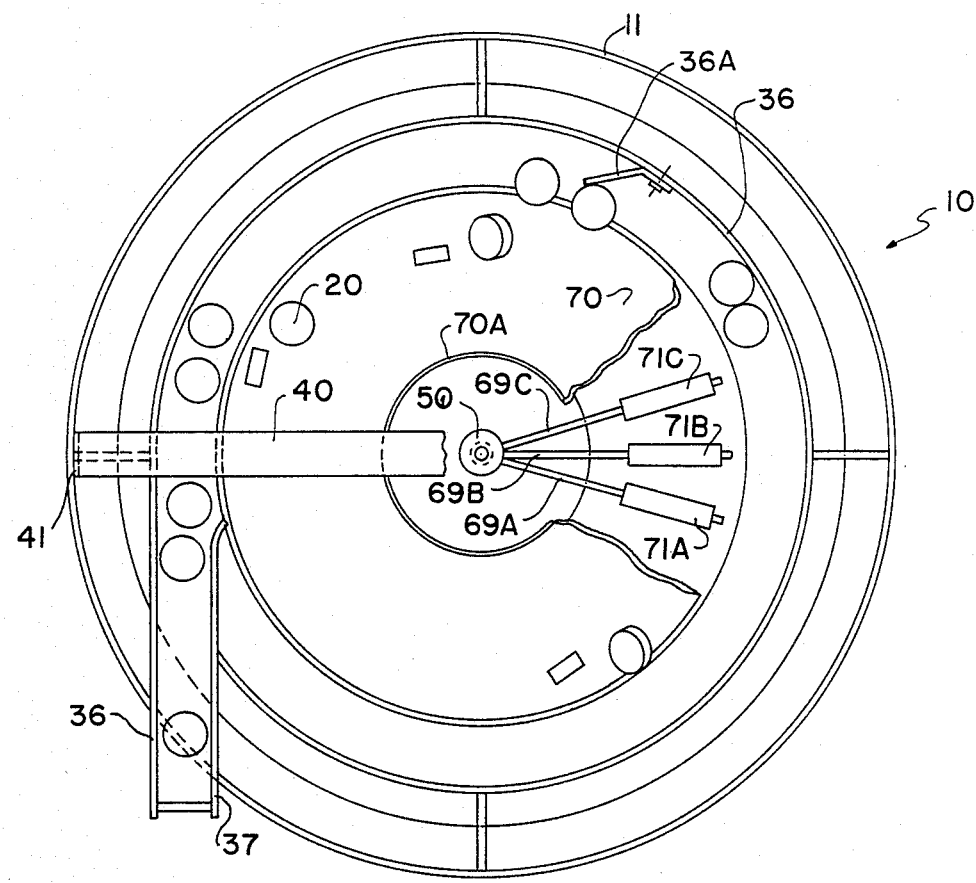
FIG. 1 is a partial cutaway top plan view illustrating the flexible disk with a portion cutaway to show the stationary ramp.
Figure 2:
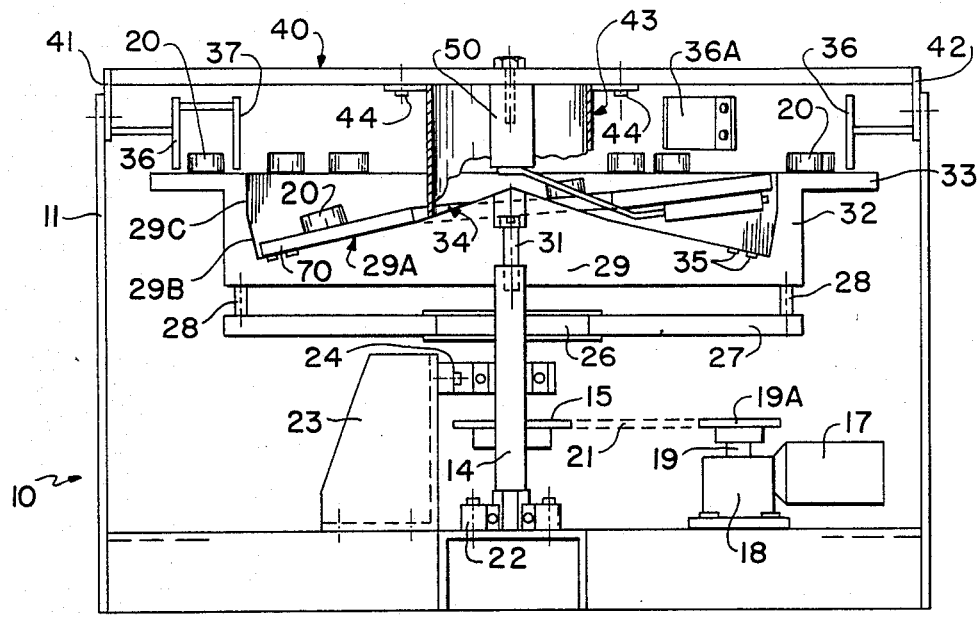
FIG. 2 is a cross-sectional view illustrating the construction of the bowl design and the drive mechanism.

FIGS. 1, 2 and 3 illustrate a rotating bowl feeder 10. The rotating bowl feeder 10 includes an outer housing 11. As illustrated in FIG. 2, a bottom 12 is provided which is affixed to the outer side walls of the housing 11. Centrally disposed within the housing 11 is a rotating shaft 14. The rotating shaft 14 is affixed to a pulley 15. A motor 17 is mounted on the lower wall 12 of the housing 11. The drive motor 17 is connected to a gear housing 18. A shaft 19 projects upwardly from the gear housing 18. A pulley 19A is affixed to the shaft 19. Drive linkage 21 is mounted between the pulley 15 and the pulley 19A. The drive linkage 21 may be a drive chain or a belt.

Referring to FIG. 2, the rotating shaft 14 is supported by a bearing 22. In addition, a support 23 is affixed to the bottom wall 12 and includes a second bearing 24 which supports an upper portion of the rotating shaft 14. In this manner, the pulley 15 disposed approximately midway between the bearings 22 and 24 is permitted to rotate the rotating shaft 14 by means of the drive linkage 21.

A center hub 26 is mounted towards one end of the rotating shaft 14. The hub 26 is affixed to a channel 27 which projects radially outwardly therefrom. Threaded rods 28 are mounted adjacent outer peripheral edges of the channel 27. A bowl 29 is affixed to the end of the rotating shaft 14 by means of a bolt 31. The bolt 31 ensures the accurate positioning of the bowl 29 relative to the rotating shaft 14. Similarly, the threaded rods 28 engage outer peripheral edges of the bowl 29. Thus, the bowl 29 is securely affixed relative to the rotating shaft 14 to rotate in unison therewith.

The bowl 29 includes upwardly projecting side walls 32. An outwardly projecting rim 33 is mounted to the end of the upwardly projecting side walls 32. The central portion of the bowl 29 includes a cone-shaped member 34. The cone-shaped member 34 ensures that articles deposited into the bowl roll by means of gravity outwardly towards the upwardly projecting walls 32. Grooves 35 may be disposed adjacent to the upwardly projecting walls 32.

A stationary retaining wall 36 may be affixed to an upper end of the housing 11. In this manner, articles which are guided from the bowl 29 upwardly onto the rim 33 can be guided by means of the retaining wall 36 to be accurately positioned around the outer rim 33. An exit guide 37 may be provided to ensure that an article 20 disposed on the rim 33 is guided towards the next work station.

FIGS. 1-3 illustrate an overhead ramp support 40. The ramp support 40 includes attaching members 41, 42. The attaching members 41, 42 are removably affixed to an upper end of the housing 11 as illustrated in FIG. 2. The overhead ramp 40 is designed to span the distance between side walls of the rotating bowl. A retaining tube 43 which ensures centering of the flexible disk 70 is mounted to approximately a midpoint of the overhead ramp support 40. As illustrated in FIG. 2, the retaining tube 43 may be affixed to the overhead ramp support 40 by means of bolts 44.

Figure 6:
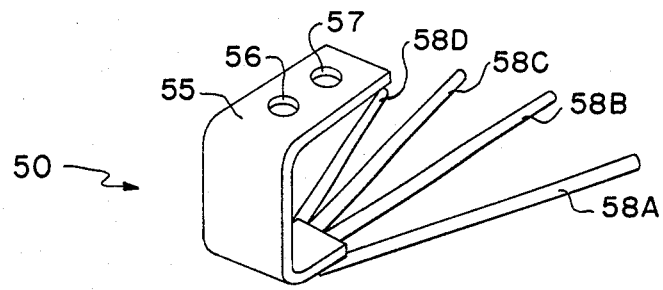
FIG. 6 is an enlarged view of another embodiment of a stationary ramp, provided with projecting fingers.

A stationary ramp 50 is provided for mounting on the overhead ramp support 40. As illustrated in FIGS. 2 and 3, a bolt 51 is provided for affixing the stationary ramp 50 relative to the overhead ramp support 40. The bolt 51 projects through the overhead ramp 40 into engagement with a threaded aperture 52 in the stationary ramp 50. The stationary ramp 50 may be constructed in a number of various manners. As illustrated in FIG. 6, the stationary ramp 50 may include a flange 55 with apertures 56, 57 disposed therein. The apertures 56, 57 permit the stationary ramp 50 to be secured to the overhead ramp support 40. A plurality of fingers 58A, 58B, 58C and 58D project outwardly from the flange 55.

In a second embodiment, as illustrated in FIG. 3, the stationary ramp 50 may include a plurality of fingers 59A, 59B, 59C and 59D. On each of the fingers 59A-59D a roller 61A, 61B, 61C and 61D is disposed.

Figure 4:
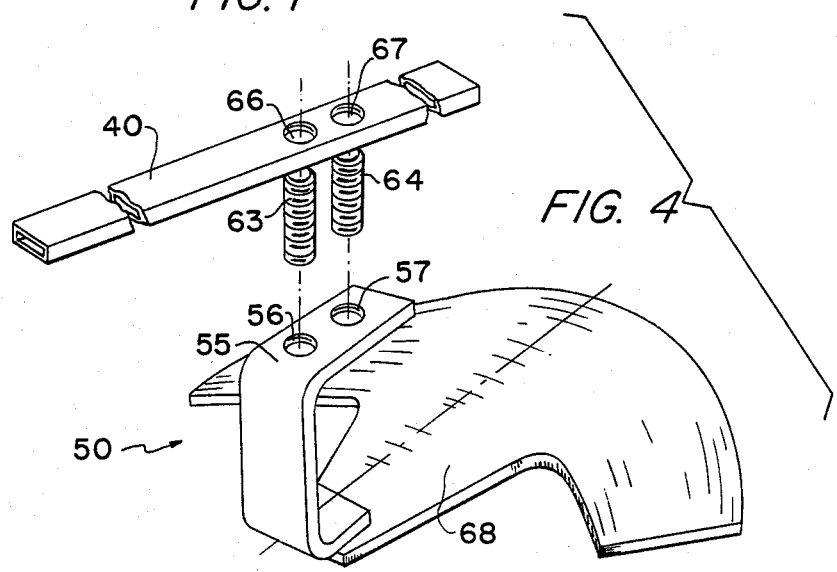
FIG. 4 is an exploded view illustrating a few components of the kit and the stationary ramp being constructed of sheet metal.

A third embodiment of the stationary ramp 50 is illustrated in FIG. 4. The stationary ramp 50 may include a flange member 55 with apertures 56, 57 disposed therein. The apertures 56, 57 are designed to be secured to the overhead ramp support 40 by means of adjusting bolts 63, 64. The adjusting bolts 63, 64 fit within the apertures 56, 57 in the flange 55 and through apertures 66, 67 in the overhead ramp support 40. A stationary sheet ramp 68 is mounted to the flange 55. The adjustable bolts 63, 64 permit the stationary sheet ramp 68 to be accurately positioned within the rotating bowl 29.

As illustrated in FIG. 1, the stationary ramp 50 may include three fingers 69A, 69B and 69C mounted at a lower end thereof. The rollers 71A, 71B and 71C are mounted on the fingers 69A-69C. Any number of fingers and any number of rollers may be utilized in order to provide a transfer point for the articles 20 which are supplied to the rotating bowl 29.

As illustrated in FIG. 2, a flexible disk 70 is provided for being positioned on an upper surface 29A of the rotating bowl 29. The flexible disk 70 rotates together with the rotating bowl 29 and is elevated by means of the stationary ramp 50 so as to transfer articles 20 disposed within the bowl 29 upwardly onto the rim 33. The flexible disk 70 is adjacent to an upper surface 29A of the rotating bowl 29 at the left portion thereof. The stationary ramp 50 guides and elevates the flexible disk 70 upwardly so that articles are transferred onto the rim 33 at the right portion of FIG. 2. As the articles are transferred onto the rim 33, they are positioned thereon by means of the stationary retaining wall 36. A qualifying bracket 36A is affixed to the retaining wall 36. In this manner, articles 20 which are not in the correct disposition on the rim 33 may be directed back into the bowl 29 for subsequent resupply onto the rim 33.

As illustrated in FIG. 3, a substantially rectangular support 26A may be provided for mounting the rotating bowl 29 onto a shaft 14A. Outwardly projecting channels 27A, 27B, 27C, 27D, 27E, 27F and 27G may be provided for affixing an outer peripheral surface of the rotating bowl 29 by means of threaded rods 28 to apertures 27AA, 27BB and 27EE. It should noted that each of the channels 27A-27G will include apertures for affixing the fingers relative to an outer peripheral surface of the rotating bowl 29.

A flexible disk 70 is illustrated in FIGS. 1, 2 and 3. The flexible disk is substantially circular and includes a circular central recess 70A. The central recess 70A is guided by means of the fixed retaining tube 43 to rotate together with the rotating bowl 29. The frictional engagement of the flexible disk 70 on the upper surface 29A of the rotating bowl 29 will ensure that the flexible disk 70 rotates together with the rotating bowl 29. In addition, as illustrated in FIG. 2, the rotating bowl 29 includes a multiwall inner surface 29B, 29C. The inner wall surface formed by two or more intersecting straight lines provides an additional guide with proper fitting and clearance for the flexible disk 70 as its outer peripheral edge 70B engages the multi-intersecting straight line wall 29B, 29C.

Figure 5:
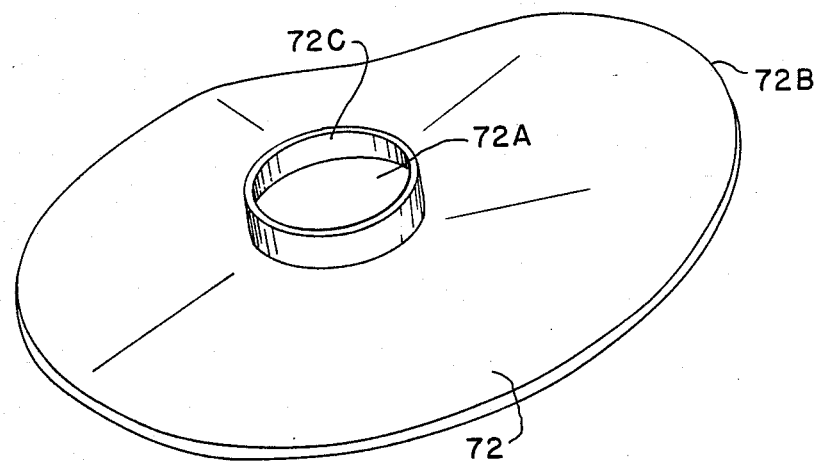
FIG. 5 is an enlarged view of the flexible disk.

A second embodiment of the flexible disk 72 is illustrated in FIG. 5. The flexible disk 72 includes a central aperture 72A. An outer peripheral edge 72B is provided in a similar manner as the flexible disk 70. A flexible collar 72C is affixed to the central opening 72A. The collar 72C replaces the retaining tube 43. In addition, if extremely small articles 20 are being transferred from the rotating bowl 29 upwardly onto the rim 33, the collar 72C ensures that the small articles 20 do not fall between the flexible disk 72 and the rotating bowl 29.

Figure 7:
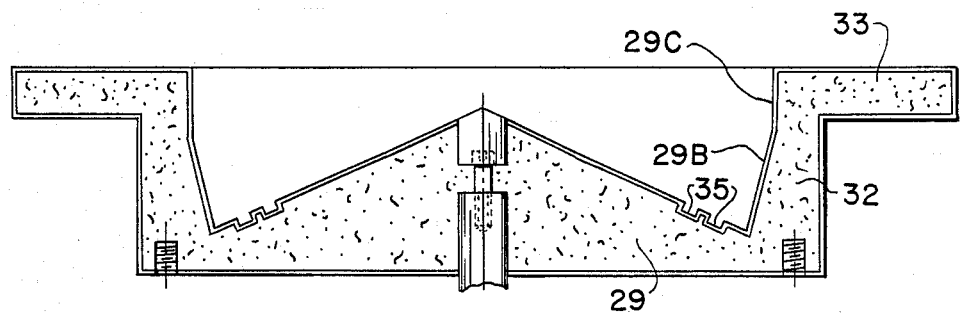
FIG. 7 is a cross-sectional view illustrating the foam core of the bowl.
Figure 8:
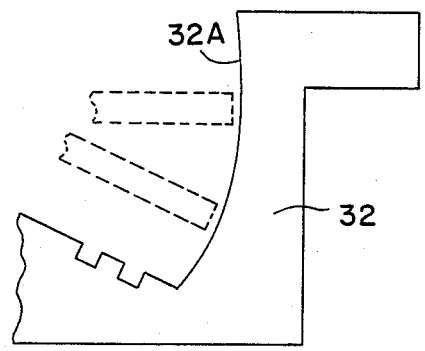
FIG. 8 is a partial cross-sectional view of the bowl illustrating the disk riding upwardly on the curved inner side wall.

FIGS. 7 and 8 illustrate embodiments of the bowl design. FIG. 7 is similar in design to the bowl 29 illustrated in FIG. 2. The side wall includes two or more intersecting straight line portions 29B and 29C. Grooves 35 are provided adjacent to the upwardly projecting side wall 32. A rim 33 is provided at the upper surface of the side wall 32. The bowl 29, as illustrated in FIG. 7, is constructed of a foam material with a durable high density skin. The foam core is of a low density. By constructing the bowl of moldable structural polyurethane foam, the weight of the bowl is greatly reduced. In addition, the durability of the skin formed by the molding process provides an ideal surface for handling articles which are supplied to the bowl 29 and transferred upwardly to the rim 33. The foam material is structural and produces a bowl which is strong, rigid, nondistortable, lightweight and economical to produce. The construction of the bowl 29 is not limited and may be constructed of other materials such as plastic, steel and aluminum.

IN OPERATION

Articles 20 are supplied to the bowl 29 for being transferred upwardly to the rim 33 at speed compatible to a fixed ramp rotating bowl feeder. The articles engage the upper surface of the flexible disk 70 and are transferred from a lower portion of the bowl upwardly to the rim 33. A stationary ramp elevates and guides the flexible disk 70 so as to enable articles 20 to actually be transferred to the rim 33 for supplying the articles to an additional work station. The stationary ramp 50 may consist of fingers 58A, 58B, a combination of fingers together with rollers on a stationary sheet metal ramp 68. Any construction of a stationary ramp 50 for permitting the flexible disk 70 to be guided so as to transfer articles 20 from the lower portion of the bowl 29 upwardly onto the rim 33 would be acceptable within the scope of the present invention.

A conventional fixed ramp rotating bowl feeder may be modified into to a flexible ramp rotating bowl feeder by employing the kit according to the present invention. More specifically, a fixed ramp may be removed from a rotating bowl feeder. Thereafter, the overhead ramp support 40 may be affixed to the housing 11 by means of the attaching members 41, 42. The retaining tube 43 projects downwardly from the overhead support 40 to be disposed within the aperture 70A of the flexible disk 70. The stationary ramp 50 is secured to the overhead ramp support 40 by means of the bolt 51. The fingers 59A-59D, 58A-58D, or 69A-69C are affixed to the stationary ramp 50 so as to be displaced away from the upper surface 29A of the rotating bowl 29. The stationary ramp 50 guides the flexible disk 70 so as to permit articles 20 disposed within the rotating bowl 29 to be transferred upwardly to the rim 33.

The drive motor 17 is a single drive motor which can be utilized to not only rotate the bowl 29, but also the flexible disk 70. Frictional engagement of the flexible disk 70 on the upper surface 29A of the rotating disk 29 permits the flexible disk to rotate together with the rotating bowl 29.

As the flexible disk 70, 72 rotates, it is self-centering due to its outer diameter being guided by the inside diameter of the bowl. The upwardly projecting side wall of the bowl is slightly curved to conform to the disk radius since the disk rotates from a low point to a high point of the bowl which becomes the rim surface. The flexible disk 70, 72 always contacts the cone-shaped surface 29A of the rotating bowl 29 except at the high point.

The flexible disk 70, 72 is held and elevated only at the high point of its rotation by means of the stationary ramp. The stationary ramp 50 is mounted through a central hole 70A, 72A of the flexible disk 70, 72. The structure of the stationary ramp 50 can be any shape or form to accomplish the desired result of elevating the flexible disk 70, 72 upwardly. A frictionless coating can be applied to the stationary ramp 50 to facilitate the movement of the flexible disk 70, 72 as it rotates over the stationary ramp 50.

The rotating bowl 29 includes a cone-shaped central portion 34 which guarantees movement of the articles 20 supplied to the rotating bowl 29 outwardly towards the side wall 32. Gravity permits articles 20 to fall down the cone-shaped member 34 so as to always position the articles 20 adjacent to the upwardly projecting side wall 32. This facilitates the transfer of the articles 20 from the lower portion of the bowl 29 upwardly to the rim 33 during rotation of the bowl 29 and the flexible disk 70, 72.

The flexible disk 70, 72 can be constructed of rubber, neoprene, molded urethane, plastic or soft structural foam. A collar 72C may be actually molded as part of the flexible disk 72. In addition, the collar 72C may actually be affixed to the stationary ramp 50.

The rotating bowl 29 and the flexible disk 70, 72 rotate at the same speed. Thus, a single drive motor 70 is provided for rotating not only the rotating bowl 29, but also the flexible disk 70, 72. This design substantially eliminates parts as has been hithertofore required. The transfer of the parts from the lower portion of the bowl 29 upwardly to the rim 33 is a gentle transfer on the flexible disk 70, 72. Thus, gradual articles can be supplied to the rotating bowl 29 for eventual sorting and supply to a subsequent work station.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. A bowl for a rotating bowl feeder comprising:
a base member having a conical upper surface and an outer peripheral edge;
upwardly projecting side walls affixed to said outer peripheral edge of said base member;
said upwardly projecting side wall having an inner surface which is curved from a lower portion of the side wall upwardly to an upper surface of the side wall; and
a rim affixed to the upper surface of the side wall and projecting outwardly therefrom;
said conical upper surface of said base is shaped to assist articles supplied thereto to fall outwardly toward the upwardly projecting side walls by means of gravity and said bowl is molded of structural polyurethane foam having a durable high density skin.

2. The bowl according to claim 1 wherein said rim provides a surface for qualifying articles fed from said bowl to said rim.

3. The bowl according to claim 1 wherein a lower portion of said base member is substantially planar.

4. The bowl according to claim 1 and further including a centrally disposed connector means for connection of said bowl to a drive means for imparting rotation to said bowl.

* * * * *